United States Patent [19]

Meinig

[11] Patent Number: 4,552,388
[45] Date of Patent: Nov. 12, 1985

[54] CORNER ANGLE ASSEMBLY

[75] Inventor: Manfred Meinig, Rietheim-Weilheim, Fed. Rep. of Germany

[73] Assignee: Karl Meinig KG, Rietheim-Weilheim, Fed. Rep. of Germany

[21] Appl. No.: 668,312

[22] Filed: Nov. 5, 1984

[30] Foreign Application Priority Data

Nov. 9, 1983 [DE] Fed. Rep. of Germany ....... 3340503

[51] Int. Cl.⁴ .............................................. F16L 23/00
[52] U.S. Cl. .................................... 285/363; 285/405; 285/424; 403/402; 403/382; 403/295
[58] Field of Search ........................ 285/363, 424, 405; 403/402, 403, 382, 295

[56] References Cited

U.S. PATENT DOCUMENTS 3,272,582 9/1966 Anderson et al. .................. 403/295

FOREIGN PATENT DOCUMENTS 702244 3/1966 Italy ..................................... 403/295
1018321 1/1966 United Kingdom ................. 403/402

Primary Examiner—Richard J. Scanlan, Jr.
Attorney, Agent, or Firm—Leonard Bloom

[57] ABSTRACT

A corner angle assembly for a structure, such as a duct work, has first and second angle pieces inserted through the respective openings in triangularly-shaped connecting flanges spot-welded to the respective walls of the structure. A first piece is inserted into its respective flange and has a contact portion extending beyond the opening in the flange. This contact portion has a groove for slidably receiving the second angle piece. The second angle piece has an upwardly-extending edge engaging the first piece for limiting the degree of insertion of the second piece. The first piece has a protruding portion bent over a beveled edge on the second piece for precluding the withdrawal of the second piece. Cooperating aligned holes in the extending portions of the respective pieces facilitate the passage of bolts or other suitable securing means. At least one of the pieces, preferably the first, is provided with an upwardly-extending reinforcing bridge engaging the adjacent side wall of the respective connecting flange.

8 Claims, 3 Drawing Figures

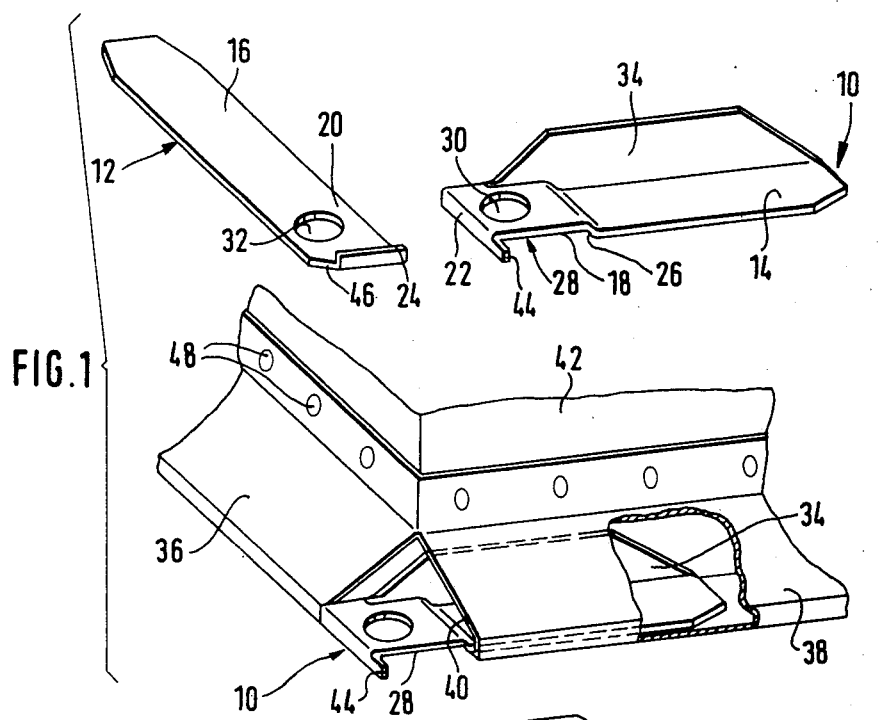
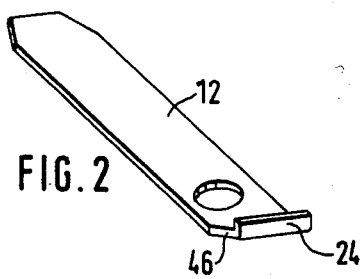
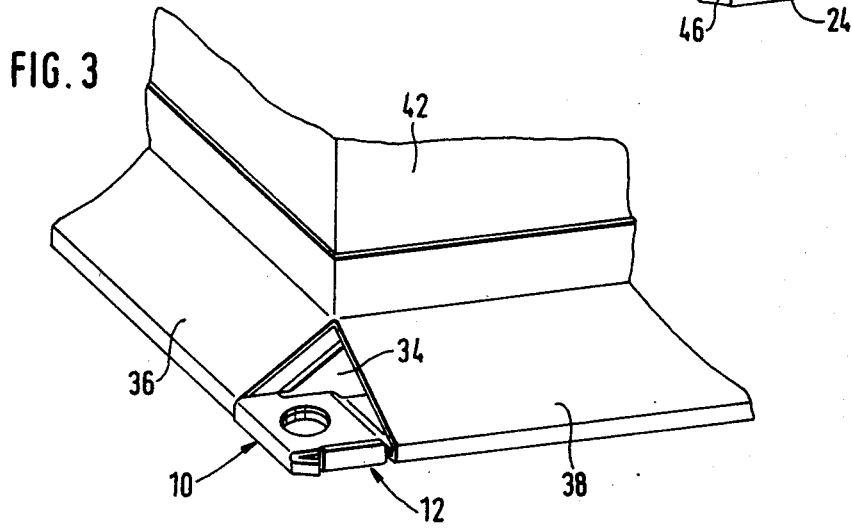

CORNER ANGLE ASSEMBLY

The present invention relates to a corner angle assembly for ducts and the like, and more particularly, to such an assembly including respective angle pieces nested with respect to each other.

BACKGROUND OF THE INVENTION

In the prior art, such as illustrated in German Utility Model Registration No. 74.08.661, separate angle-iron pieces are used in connection with supporting flanges which are attached to respective metal duct walls or segments arranged substantially perpendicular to each other. The supporting flanges are secured to the respective duct walls, as for example by spot welding; and the assembly of the duct walls and supporting flanges are usually shipped in disassembled form to the construction site and when delivered, are assembled at the site. The angle irons (or other angle pieces) are then inserted within the supporting flanges and secured to the base or other supporting structure.

This prior art arrangement, while generally satisfactory, nevertheless has a number of inherent disadvantages. With the first angle piece already inserted, it is difficult to insert the second piece; the second piece is often lifted up by the first piece and gets stuck in the profile of the respective supporting flange. Thus, the second piece must be hammered into its final position, which widens the profile space as the second piece is forced upwardly by the first piece. the second piece, after insertion, rests loosely in its respective supporting flange, whose profile is stretched during the insertion of the second piece therein. A second disadvantage is encountered in that the two angle pieces experience a strong bending stress between the respective legs and contact areas thereof; and as a result, the angle pieces bend easily in the area between the leg and contact areas. The stability or resistance to bending is limited, which is a disadvantage when two adjacent duct segments are being sealed.

Since insertion of the second angle piece, once the first piece is inserted, is difficult, only relatively-thin guages of sheet metal can be used for the respective angle pieces. Therefore, the bending stability cannot be readiy improved by using thicker guages of material. The angle pieces have a relative loose contact, especially since the second piece is disposed loosely due to the stretched profile of the supporting flange, and thus the two angle pieces may be displaced from their secured position when encountering even a relatively minimal stress.

These loose pieces may slip out during transport and assembly, which is a further disadvantage. In an attempt to correct this problem, the second piece has been held in place by a rivet carried by a hole in the second piece and received through the profile of the respective supporting flange. The pressing through of these rivets is performed by a special pneumatic tool, which necessitates a further operation.

SUMMARY OF THE INVENTION

It is an object of the present invention to provide new and improved pieces for a corner angle assembly for ducts and the like, which alleviates the disadvantages and deficiencies of the prior art.

It is another object to provide angle pieces which eliminate any stretching or damaging during insertion into the respective supporting flanges, and which eliminates bending or breaking of the pieces during the process of bolting them together.

It is yet another object to facilitate the use of thicker sheet-metal pieces for greater stress resistance in the critical region between the contact area and the leg of the respective pieces, yet without forming an obstacle to insertion into the respective flanges.

It is a further object to provide a means for locking the pieces together, and to allow the respective contact areas of the pieces to touch each other smoothly, thereby precluding stress during insertion and tightening of the bolts, and thereby accommodating greater bending stresses at the corners.

It is a still further object to provide respective pieces that will not slip with respect to each other.

It is yet a still further object to provide respective pieces that may be manufactured easily and economically, referably as sheet-metal stampings, and which may be assembled quickly and conveniently at the construction site.

In accordance with the teachings of the present invention, a preferred embodiment is herein disclosed, wherein the first piece has a bend formed therein to provide a contact area offset from the leg portion thereof, thereby defining a groove for the insertion of the second piece therein. The second piece is formed as a flat plate having a respective leg portion and a contact area in substantially the same plane. An upturned edge on the second piece abuts the first piece and limits the insertion of the second piece. A protruding pin on the first piece is then bent over a beveled edge on the second piece, thereby preventing the withdrawal of the second piece.

In accordance with the further teachings, the first piece has a reinforcing bridge bent upwardly therefrom, substantially perpendicularly thereof, and disposed against the adjacent wall of the supporting flange. Preferably, this reinforcing bridge overlaps at least a portion of the respective contact area of the first piece.

These and other objects of the present invention will become apparent from a reading of the following specification, taken in conjunction with the enclosed drawings.

BRIEF DESCRIPTION OF THE DRAWINGS

FIG. 1 shows the first and second pieces (in perspective) in exploded relationship to one another.

FIG. 2 is a partial perspective of a "canal" or duct segment, showing the connecting flanges spot-welded thereto, and further showing the first piece inserted and the second piece in its position prior to insertion.

FIG. 3 is a perspective view, corresponding substantially to FIG. 1, but showing the respective pieces completely inserted and interlocked together.

With respect of FIG. 1, the first piece is denoted generally as 10, and the second piece is denoted generally as 12. These pieces 10 and 12 have respective legs 14, 16 and adjacent contact areas 18 and 20, respectively. These contact areas 18, 20 have perpendicular edges 22, 24, respectively, opposite to the leg portions 14, 16, respectively. The first piece 10 further has a bend 26 which forms, together with contact area 18 and perpendicular edge 22, a guide groove 28 into which the second piece 12 is guided conveniently during the insertion thereof into its respective flange. Both contact areas 18 and 20, respectively, have bolt holes 30 and 32, respectively, which overlap or are aligned with each other in the connected position of the flanges, as shown more clearly in FIG. 3.

The first piece 10 has along one edge thereof an upwardly-bent reinforcing bridge 34, which extends substantially over the complete length of the leg 14 and over at least a fraction of the contact area 18. This reinforcing bridge is perpendicular to leg 14 and is in flat contact with the inner wall of the flange profile, thereby facilitating a very high stress resistance of the contact area 18 with respect to the leg 14.

The angle pieces of the present invention are inserted into the open profile ends 40 of the substantially triangular connecting flanges 36 and 38, respectively. These flanges are spot-welded (as at 48) to the end of a sheet-metal "canal" or duct segment 42. As shown in FIG. 2, the angle piece 10 is first inserted into its connecting flange 38, such that its reinforcing bridge 34 extends upwardly, perpendicular to leg 14, and slides against the inner profile wall of flange 38. The second piece 12 is then inserted through the groove 28 of the first piece 10 and into the other flange 36 until the perpendicular edge 24 of the second piece contacts the outer edge of the contact area 18 of the first piece.

Subsequently, a protruding pin or lug 44 on the first piece is bent by approximately 45° (via a hammer blow) such that the pin 44 rests against the beveled edge 46 of the second piece. This locks the first piece in place and precludes withdrawal of the second piece 12.

Obviously, many modifications may be made without departing from the basic spirit of the present invention. Accordingly, within the scope of the appended claims, the invention may be practiced other than specifically disclosed herein.

What is claimed is:

1. In a corner angle assembly, wherein two separate pieces have respective legs adapted to be inserted into openings formed in respective supporting flanges, wherein the flanges are attached to respective metal duct segments, wherein the pieces have respective contact areas overlapping one another and are provided with aligned screw-holes, and wherein each of the contact areas has a perpendicularly bent end edge portion, the improvement wherein the leg and contact area of the second piece are substantially in the same plane, wherein the contact area of the first piece is substantially parallel but off-set in one direction from the leg of the first piece, and wherein the respective perpendicularly bent edge portion of the first piece extends in a direction opposite said one direction and cooperates with the respective off-set contact area of the first piece to form a guide groove for insertion of the second piece therein.

2. The improvement of claim 1, wherein the first piece further has a reinforcing bridge which overlaps at least a portion of the contact area of the first piece.

3. The improvement of claim 2, wherein the reinforcing bridge is substantially a flat piece which is perpendicular to the planes of the leg and the contact area of the first piece.

4. The improvement of claim 3, wherein the reinforcing bridge is a singular piece, formed as an edge portion of the leg of the first piece, and bent in a direction opposite to the bent perpendicular edge portion of the first piece.

5. The improvement of claim 4, wherein the perpendicularly bent edge portion of the first piece includes a protruding pin, and wherein the second piece includes a beveled edge, the arrangement being such that the pin can be bent into the beveled edge of the second piece, when the two pieces are connected.

6. In a corner angle assembly, wherein two separate pieces have respective legs adapted to be inserted into openings formed in respective connecting flanges, wherein the flanges are in turn attached to respective metal duct segments, wherein the two pieces have respective contact areas adapted to engage one another, and wherein each of the contact areas has a perpendicularly bent edge portion and overlapping screw holes, the improvement wherein the second piece comprises substantially a flat plate having a leg and a contact area in substantially the same plane, wherein the contact area of the first piece is substantially parallel to, but in one direction from the leg of the first piece, wherein the respective perpendicularly bent edge portion of the first piece extends in a direction opposite said one direction, thereby forming with the offset contact area of the first piece a guide groove for insertion of the second piece therein, wherein the first piece further has a reinforcing bridge which overlaps at least a portion of the offset contact area of the first piece, the reinforcing bridge comprising a substantially flat piece formed as a bent edge portion of the leg of the first piece, extending in a direction opposite to the perpendicularly bent edge portion of the first piece and arranged perpendicular to the leg of the first piece, the second piece including a beveled edge, and the first piece including a protruding pin, the arrangement being such that the pin may be bent into the beveled edge when the first and second pieces are connected together.

7. In a structure, wherein a pair of intersecting plates have respective connecting flanges secured thereto substantially perpendicular to each other, adjoining ends thereof, each of the flanges having an opening formed therein, the openings being adjacent to one another, the improvement which comprises, in combination, a first piece slidably inserted into one of the flanges and having a respective portion extending beyond the opening therein, the extending portion of the first piece having groove means formed therein, a second piece inserted through the groove means in the first piece and into the other flange, the second piece having a respective portion extending beyond the opening in the other flange, cooperating means between the first and second pieces for limiting the insertion of the second piece through the groove means in the first piece, and the first piece having a further portion thereof bent over a respective portion of the second piece, after the insertion of the second piece, to prevent the withdrawal thereof.

8. A corner angle assembly, comprising mutually-perpendicular conecting flanges secured to the base of the assembly, each of the connecting flanges having an opening formed therein, the openings confronting one another at a corner of the assembly, a first piece inserted into the respective opening in one of the flanges and having a portion extending beyond the opening thereof, the respective portion of the first piece having a groove formed therein, a second piece slidably inserted into the groove and into the respective opening of the other flange, means on the second piece for abutting the first piece for limiting the insertion of the second piece into the other flange, whereby the second piece has a respective portion extending outwardly of the opening in the other flange, means on the first piece for subsequently engaging the second piece to preclude the removal of the second piece, and substantially-aligned respective apertures in the respective extending portions of the first and second pieces for receiving fastening means therethrough.

* * * * *